United States Patent [19]
Johansson

[11] 3,737,109

[45] June 5, 1973

[54] DOUBLE-ACTING AXIAL THRUST AND RADIAL BEARINGS FOR GRINDING APPARATUS

[75] Inventor: Johan Gunnar Inge Johansson, Taby, Sweden

[73] Assignee: Defibrator Aktiebolag, Stockholm, Sweden

[22] Filed: Nov. 23, 1970

[21] Appl. No.: 91,638

[30] Foreign Application Priority Data

Oct. 26, 1970   Sweden..............................14436/70

[52] U.S. Cl..............................................241/37
[51] Int. Cl..............................................B02c 25/00
[58] Field of Search.............................241/256, 37; 308/189 A, 207 A

[56] References Cited

UNITED STATES PATENTS

| | | | |
|---|---|---|---|
| 3,212,721 | 10/1965 | Asplund et al. | 241/37 |
| 3,574,424 | 4/1971 | Hagemeister | 308/189 |

FOREIGN PATENTS OR APPLICATIONS

| | | | |
|---|---|---|---|
| 110,804 | 5/1964 | Czechoslovakia | 308/207 A |

Primary Examiner—Robert L. Spruill
Attorney—Eric Y. Munson

[57] ABSTRACT

A combined axial and radial thrust bearing device for a rotary shaft composed of two components, each of which comprises an annular ring fixed to the shaft and an annular ring supported free of the shaft both of which rings engage each other through bearing means. Between the two opposing free annular rings is provided a member which is adapted to exert internal pressure on the annular rings in an axial direction to minimize play between the two components. The member is adapted to be actuated by a pressure fluid in such a manner that the internal pressure exerted on the annular rings is reduced in response to an increase in pressure in an axial direction exerted on the shaft externally of the bearing.

4 Claims, 5 Drawing Figures

DOUBLE-ACTING AXIAL THRUST AND RADIAL BEARINGS FOR GRINDING APPARATUS

BACKGROUND OF THE INVENTION

This invention relates to a device in double-acting axial thrust and radial bearings, primarily for grinding apparatus of the disc type.

More particularly this invention relates to a device in a double-acting axial thrust and radial bearing, comprising two halves, each half consisting of an outer ring, an inner ring and, if desired, roller members disposed therebetween, a bearing casing element positioned between the two outer rings housing at least one member producing an inner pressure acting in axial direction against the outer ring members to eliminate undesired bearing play in the two bearing halves.

The invention has been developed primarily for application in grinding apparatuses such as defibrators, refiners, preferably for working ligno-cellulose containing material, and it shall be exemplified in the following in connection with machines of such kind. The usual type of grinding apparatus comprises two grinding discs rotatable relatively to one another, of which at least one is carried by a rotatable shaft supported by at least one combined axial thrust and radial bearing, said disc being forced against the other disc by means of an axial, variable grinding pressure transferred over the combined axial thrust and radial bearing.

THE PRIOR ART

It is known in a combined axial thrust and radial bearing to design said means as springs, which are preloaded so that they continuously exert an axial inner pressure forcing the two halves of the bearing in a direction from one another while producing a radial pressure component. The object of the invention is to eliminate the effect of the bearing play between the rotating and the stationary parts of the bearing which play otherwise would create vibrations of the shaft and destroy the parallelism of the grinding disc rotating therewith, when the grinding pressure acting in axial direction during rotation of the shaft falls below a predetermined value or comes to a total stop. Shorter or longer conditions of operation of this kind occur continuously in a grinding apparatus and the strong vibrations appearing in connection therewith have a harmful effect on the grinding apparatus. When, however, grinding pressure under supply of milling produce is transferred from the servomotor through one half of the bearing to the interspace between the grinding disc, the bearing play disappears. It now becomes evident that the axial pressure from the springs exerts an additional load on the bearing which demands a substantial reduction of the grinding pressure with consequent reduction of the grinding capacity in order to preserve the life of the bearing. The other alternative is to increase the dimensions of the bearing in order to reduce the specific load on the bearing. This expedient, is, however, accompanied by great drawbacks from the view point of space and costs.

SUMMARY OF THE INVENTION

One main object of the invention is to eliminate the said inconveniences so that the members mounted in the double-acting axial thrust and radial bearing of the type in consideration are fully capable to eliminate the bearing play even when the axial pressure acting on the bearing, primarily the grinding pressure, is insufficient for this purpose, but which are relieved when the interior bearing pressure, is no longer required. According to one main feature of the invention the member is adapted to be actuated over a pressure chamber by a pressure fluid in such a manner that said interior pressure is reduced when axial pressure exerted from outside of the bearing is increased.

As an example of grinding machines to which this invention is applicable with particular advantage the apparatus described in the co-pending U.S. Pat. application Ser. No. 830641 filed July 5, 1969 and now U.S. Pat. No. 3,629,482 may be mentioned, according to which the rotatable grinding disc is forced against the other grinding disc by means of a double-acting hydraulic servo motor, said servo motor having two pressure chambers producing an axial pressure acting on the rotatable shaft in directions opposed to one another which pressure is transferred to the grinding disc through the bearing. In a specific embodiment the rotatable shaft is actuated by two servo motors for producing the grinding pressure between the two grinding discs.

BRIEF DESCRIPTION OF THE DRAWINGS

These and other objects, advantages and features of the invention will become apparent from the following description, considered in connection with the accompanying drawings which show an embodiment of the invention and which form part of this specification and of which.

DESCRIPTION OF THE PREFERRED EMBODIMENT

Figure 1:
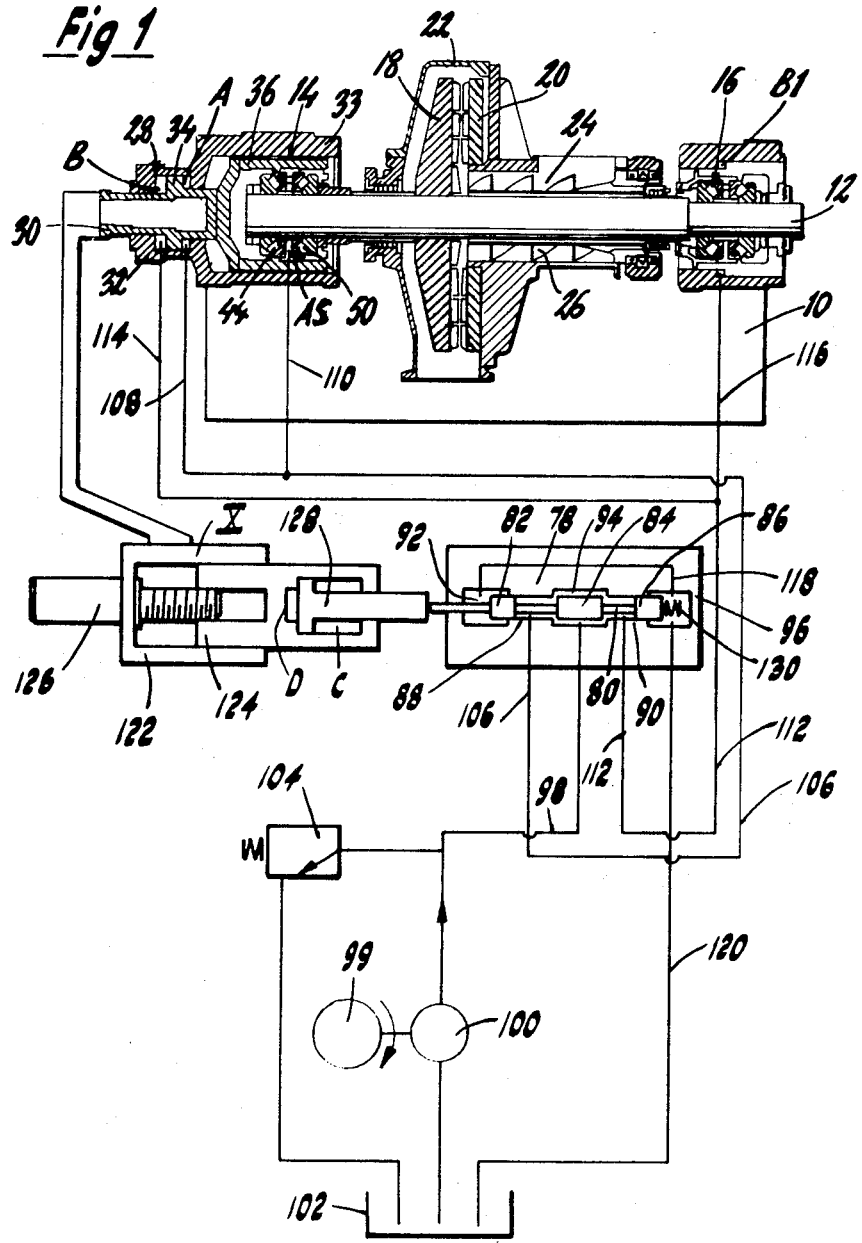
FIG. 1 is a vertical longitudinal section through a grinding apparatus devised with bearings according to the Figure also on a larger scale showing a pilot valve for directing the pressure fluid to various pressure chambers formed in the grinding apparatus.

Referring now to FIG. 1 reference numeral 10 denotes the base of the apparatus in which base a shaft 12 is mounted in two double-acting axial thrust and radial bearings generally denoted 14, 16. The shaft 12 is at its right-hand end formed for attachment to a driving motor not shown. The shaft carries a grinding disc 18 and is together with said grinding disc adjustable in axial direction relatively to a stationary grinding disc 20. The grinding discs 18, 20 are encased in a grinding casing 22 and the grinding produce is introduced through a channel 24 disposed concentrically around the shaft and, if desired, provided with a conveyor 26 to be conducted by said conveyor in outward direction and worked by the grinding surfaces which are formed on the sides facing one another of the grinding discs in a manner known per se and therefore not described here in more detail.

Mounted adjacent the front part bearing 14 and coaxially with the shaft 12 is a servo motor generally denoted 28. This servo motor consists of a piston 30 which is axially displaceable but not rotatable within a stationary casing 32. Formed in the casing 32 on either side of a central flange 34 of the piston are pressure chambers for a pressure fluid and denoted, respectively, B and A and communicating with a pressure fluid source in a manner to be described more closely below. The piston 30 is coupled together with an interior non-rotatable bearing body 36 for the bearing 14 and is together with said body axially displaceable relatively to the stationary servo motor casing 32 and an extension of this latter forming an outer bearing casing 33.

The bearing 14 (see especially FIGS. 2 and 3) is composed of two halves of which the one comprises an inner ring 38 secured onto the shaft 12, an outer ring 40 carried by a stationary ring element 42 formed in section as a T and conical rollers 44 disposed between the two rings and cooperating with conical roller ways formed on the two rings. In the same manner the other half of the bearing consists of an inner ring 46 rigidly secured onto the shaft, an outer ring 48 and conical rollers 50. The two halves of the bearing are capable of together transferring a radial load from the shaft 12 to the rigid stationary base. Due to the feature that the bearing halves are reversed they can in addition transfer axial pressure from the servo motor 28 to the grinding disc 18 in mutually opposed directions.

Figure 2:
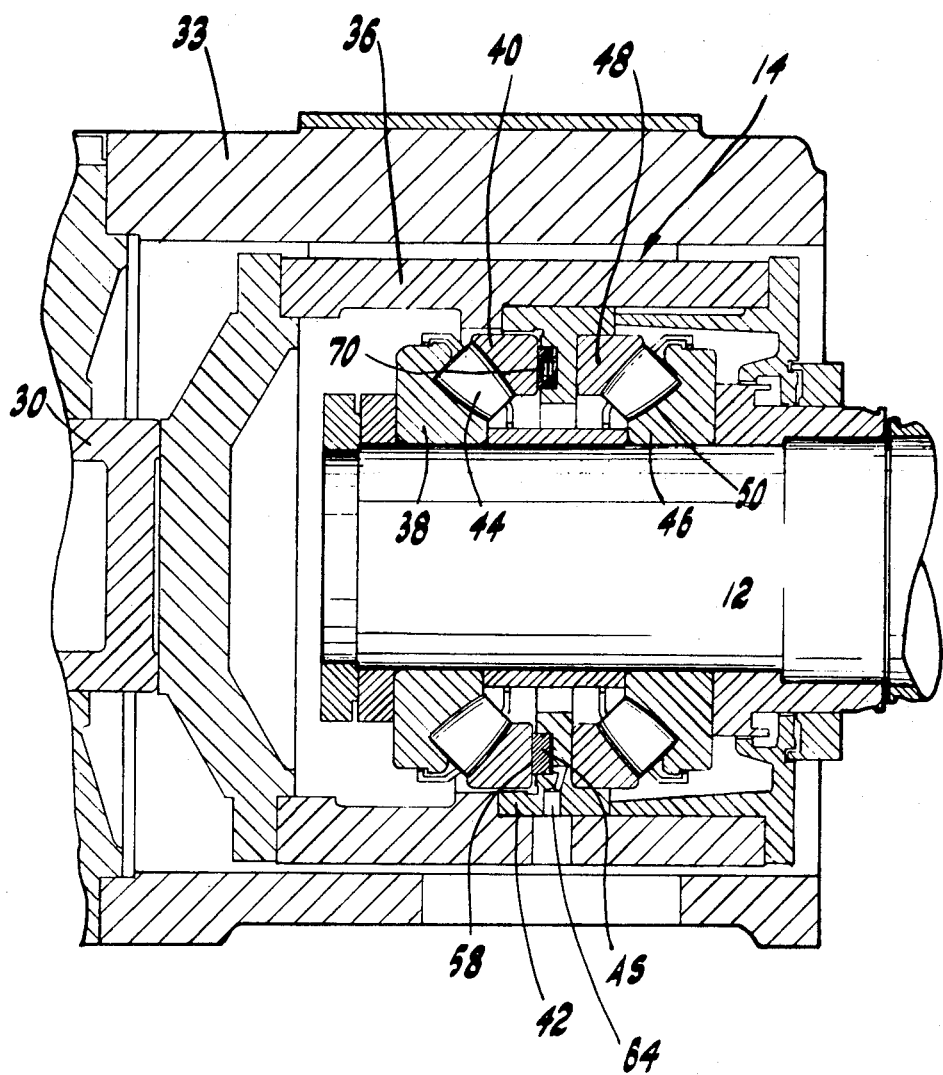
FIG. 2 shows in the same section as but in an enlarged scale an axial thrust and radial bearing constructed according to the invention and located on the left-hand side, also to be called the front part of the apparatus as illustrated in FIG. 1.
Figure 4:
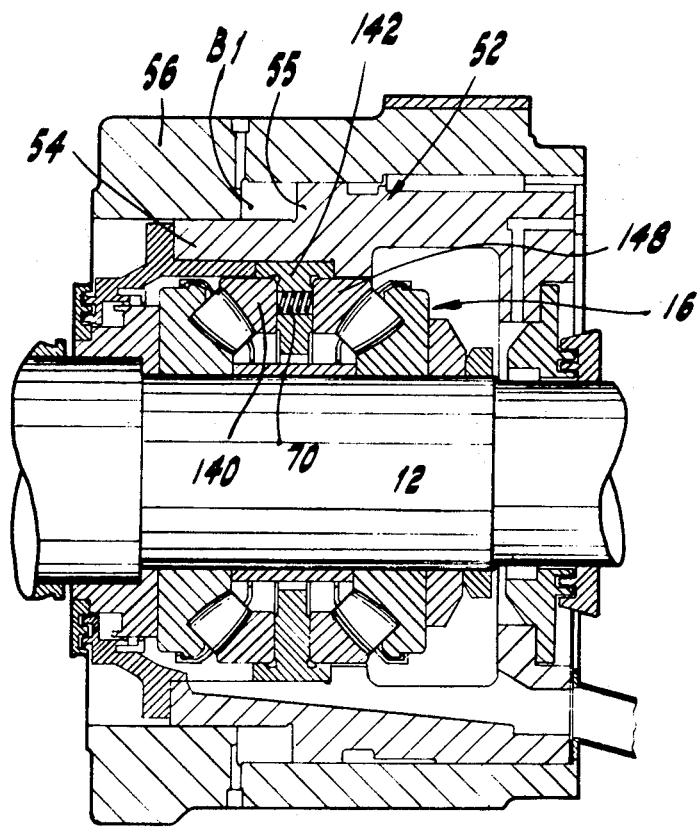
FIG. 4 shows an axial thrust and radial bearing in the same section but in a larger scale than in FIG. 1 located on the right-hand side in said FIG. 1 and therefore also called the rear part.

In FIG. 4 the individual parts of the rear axial thrust and radial bearing 16 have been given the same reference numerals as in FIG. 2, but with an additional head numeral 1. The T-shaped stationary bearing element 142 is inserted into piston 54 of a servo motor 52 and formed with a flange 55, said piston being non-rotatable but axially displaceable within a stationary casing 56. This servo motor needs only be single-acting, e.g., it has only on its one side a pressure chamber B1, which is supplied with pressure fluid in a manner to be explained in the following.

Figure 3:
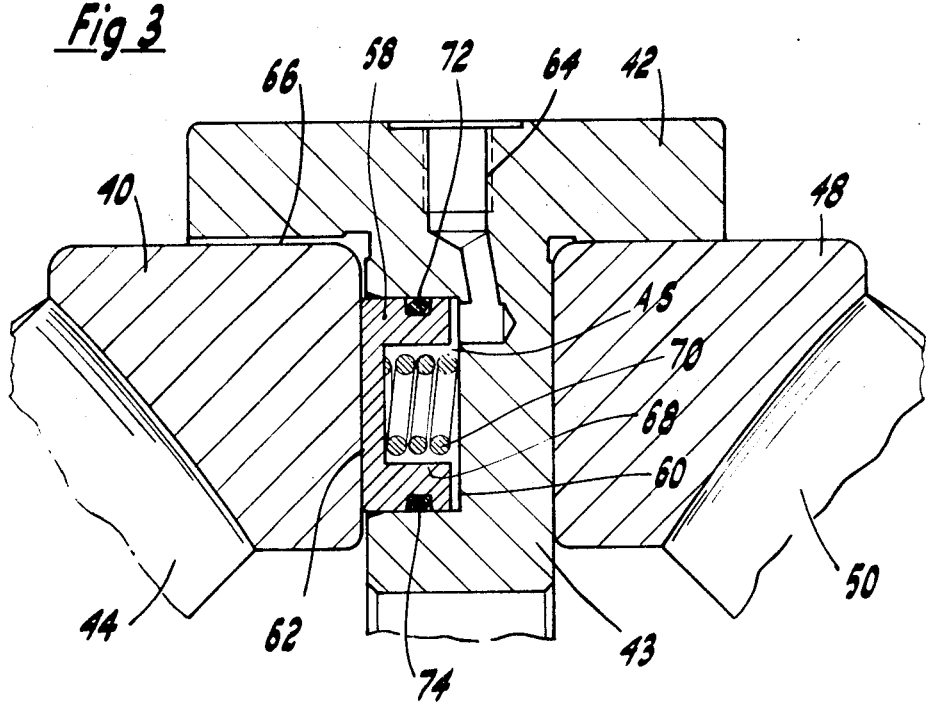
FIG. 3 shows a portion of said bearing in a still more enlarged scale.

According to the invention the front bearing 14 is provided with an annular piston 58 which is located in a recess in one lateral surface of the T-shaped ring element 42, said recess in the same manner as the piston extending around the circumference of the bearing. The piston 58 has a plane surface 62 which acts on the outer ring 40 in the left-hand half of the bearing 14. Formed behind the piston 58 is a pressure chamber AS, which through one or several conduits 64 is in communication with a pressure fluid source as shall be described in greater detail more below. When pressure fluid is fed into the chamber AS, the piston 58 will exert a pressure on the outer ring 40 and simultaneously an equally great counter-pressure will be produced to act against the outer ring 48 of the right-hand bearing half. The result of these actions is that the play between the various bearing parts is eliminated, so that the shaft is guided exactly in radial direction. As is indicated in FIGS. 2 and 3, the outer ring 40 is formed with a relatively great radial play 66 relative the outer flange portion of the bearing element 42 whereas the outer ring 48 is fitted into the flange of the element 42 on the opposite side of central portion 43 of the latter.

The piston 58 may be formed with a plurality of axial bores 68, into which springs 70 are inserted. These springs have only such an elastic force as to maintain the position of the various elements of the bearing relative to one another, when the bearing is properly adjusted. The piston 58 is namely sealed against the cylindrical outer and inner surfaces of the recess 60 by means of O-rings 72, 74.

The bearing 16 may also be provided with a fluid-actuated plunger, but the necessity of such plunger is eliminated when, as in the present case, the servo motor 52 continuously exerts an axial pressure on the bearing in one and the same direction. Thus, in the shown embodiment only a plurality of preloaded, relatively weak helical springs 70 are interposed in circumferentially spaced relationship, as indicated above into the T-shaped annular element 142 between the outer bearing rings 140 and 148.

According to FIG. 1 a pilot valve 78 is formed with a cylindrical space within which a plunger 80 is disposed slidably. The plunger 80 has three annular flanges 82, 84, 86 which slidably cooperate with the portions of reduced diameter 88, 90 of the cylindrical bore. Between these portions with reduced diameter, chambers 92, 94, 96 are formed. Opening into the central chamber 94 is a conduit 98 which is in communication with a pump 100 driven by a motor 99 and supplied with a pressure fluid such as oil from an oil pan 102 and which by means of an overflow valve 104 maintains a constant pressure of e.g., 30 kps/cm². Opening into the portion 88 of reduced diameter in the pilot valve is a conduit 106 which through branch conduits 108, 110 communicates with the pressure chambers A and AS in the servo motor 28 and the bearing 14, respectively. Another conduit 112 extends from the portion 90 with reduced diameter in the pilot valve and has branch conduits 114, 116 opening into, respectively, the pressure chamber B of the servo motor 28 and the pressure chamber B1 of the servo motor 52. The two lateral chambers 92, 96 in the pilot valve are interconnected by a conduit 118 and connected to an outlet 120 returning to the oil pan 102.

A control member (FIG. 1) has a sleeve-shaped element 122 which is fixedly attached to the piston 30 and thus follows the same in the axial motion thereof. Within the element 122 a cylinder 124 is manually adjustable in its axial position by means of a screw 126. The cylinder 124 preferably houses a piston 128 which is actuated by the pressure in pressure chambers C and D defined by the end faces of said piston. The plunger 80 in the pilot valve is by means of a spring 130 continuously forced against the piston 128. When a pressure is produced in the chamber C, the piston 128 takes a left-hand end position in the cylinder 124 according to FIG. 1 which corresponds to the operative position of the grinding discs 18, 20. By, instead thereof, supplying pressure fluid to the chamber D, the plunger 80 is reversed so that the grinding discs are brought apart. The supply of pressure fluid to the chambers C and D is effected through a four-way valve in response to actuation of control buttons not shown here.

When the pilot valve 80 is in its starting or initial position the pressure fluid supplied through the conduit 98 is suitably distributed so that the full specific pressure, i.e., in the illustrated example 30 kps/cm², prevails in the conduits 108, 110 and thus also in the pressure chambers A and AS whereas the specific pressure is half the value, i.e., 15 kps/cm², in the conduits 114, 116 and thus also in the pressure chambers B and B1. This specific difference in the pressure is the result of the plunger 80 assuming an axial position in which its radial flange 84 permits unobstructed flow from the chamber 94 to the conduit 106 whereas it throttles the blow to the portion 90 of reduced diameter which communicates with the conduit 112. The initial adjustment of the plunger 80 is effected by means of the screw 126 and the piston 128 assumes the abovementioned left-hand end position according to FIG. 1. The effective pressure area in the chamber A within the servo motor 28 is preferably approximately one half of a combined effective area in the chambers B and B1, and since the combined pressures in the two last mentioned cases act in opposite direction to the pressure in the first-mentioned case, the resulting axial pressure exerted on the shaft 12 becomes zero or approximately zero. The two grinding discs thus assume an initial position where no grinding produce is supplied to them so that no grinding pressure can be produced between them. This should result in the front bearing 14 not being subjected to any axial load so that no counterweight should be needed against undesired play in the bearing. This would result in, a powerful stroke-like vibration with consequent deleterious effect on the bearing due to the inevitable unbalance of the system, especially in the grinding segments of the rotating disc. According to the invention, however, full oil pressure is in this position operative in the chamber AS of the bearing 14 and forces the outer bearing rings 40, 48 against the associated series of rollers 44, 50 and these in turn against the inner rings 38 and 46, respectively, until the play in the bearing is entirely eliminated.

Figure 5:
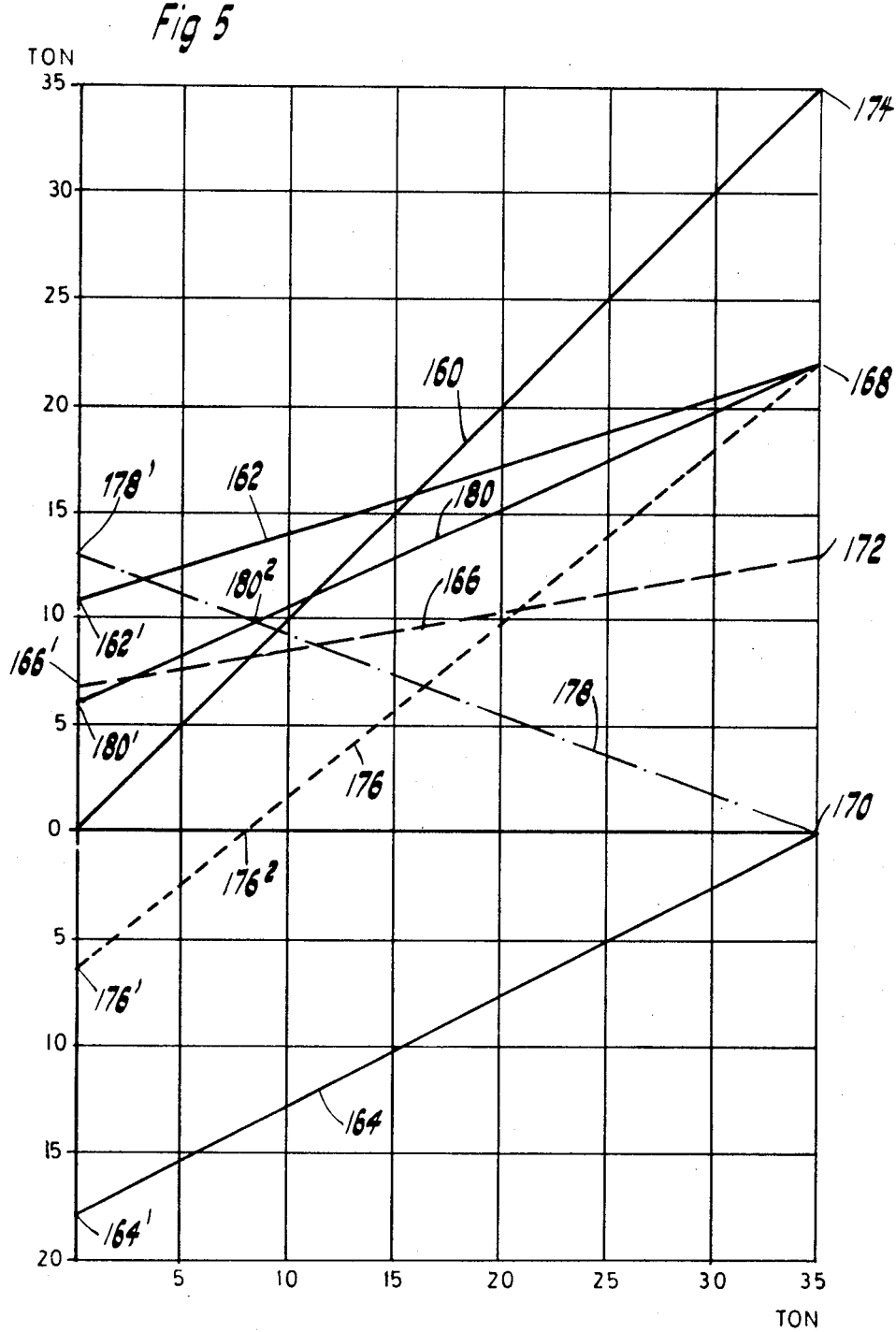
FIG. 5 is a graph.

FIG. 5 shows a diagram the ordinate of which indicates in tons the pressures prevailing in the various chambers, whereas the abscissa indicates also in tons, how these pressures are changed by the grinding pressure operative between the grinding discs increasing from zero to full value, which in the example is assumed to be 35 tons. Pressures acting in the direction from left to right according to FIG. 1 ("positive pressures") are set out above the abscissa and pressures acting in left-hand direction ("negative pressures") below the same. The pressure operative between the grinding discs follows the diagram line 160, which extends from 0 to 35 tons. This resulting line thus illustrates how the pressure in the interspace between the grinding discs is growing as more and more grinding produce is fed into the interspace until full predetermined capacity has been reached. Due to the fact that the control member 122, 126, 128 follows the servo motor piston 30 and therewith the shaft 12, the plunger 80 of the pilot valve 78 will with increasing grinding effect be displaced to the left whereby the supply of pressure fluid to the chambers B, B1 grows from e.g., 15 kps/cm² to the maximum value of 30 kps/cm². In return the pressure in the chambers A and AS falls from 30 kps/cm² to 0. These changes in pressure are also illustrated in FIG. 5.

Thus, the pressure in the chamber B varies according to line 162, in the chamber A according to line 164 and in the chamber B1 according to line 166. In the initial position, when the abscissa is zero, the pressure 162¹ is operative in the chamber B and the pressure 166¹ in the chamber B1, which pressures both are "positive" and thus tend to bring the grinding discs nearer to one another. These two pressures are outweighed by the pressure 164¹ in the chamber A and the resultant will be 0, according to the line 160.

With full grinding effect between the grinding discs the pressure diagram line 162 has reached value 168, e.g., 22 tons, the curve line 164 value 170 on the abscissa, thus 0 ton, whereas the line 166 has risen to the point 172 which in the example is 13 tons. The total pressure operative between the grinding discs will thus be 22 + 0 + 13 = 35 tons corresponding to point 174 on line 160.

The resultant of the pressures acting against one another in the chambers A and B of the servo motor 28 according to the lines 164 and 160 follow line 176. In the abovementioned initial position the pressure operative in the direction away from the grinding disc 18 preponderates in the chamber A so that the result will be a "negative" pressure according to point 176¹. When thereupon the grinding discs are loaded and the plunger 80 of the pilot valve moves to the left viewed according to FIG. 1, the specific pressure in the chamber B is increased whereas it decreases in the chamber A. The line 176 intersects the abscissa at point 176² and reaches the final pressure value according to point 168.

The pressure in the chamber AS follows line 178 in FIG. 5, i.e., it has its highest value 178¹ when the grinding discs are not loaded and drops thereafter towards 0 with increasing grinding pressure between said discs. The axial inner pressure in the bearing 14 is thus reduced in the same degree as the grinding pressure rises which insures elimination of play in the bearing by the pressure in the piston chamber AS, until the grinding pressure has become sufficiently great to absorb the play. It will thus be apparent that the bearing never needs be loaded over the axial grinding pressure whereby a correspondingly long operative life of the bearing is obtained.

Finally, a line 180 is drawn in FIG. 5 to indicate the load acting on the right-hand bearing part 46, 48, 50 of the bearing 14 and thus corresponds to the resultant of the total pressure graph 176 of the servo motor and applied inner variable load according to line 178. In the initial position when the grinding discs go empty, it is apparent that a "positive" load according to point 180¹ acts on the bearing portion at right hand which load is constituted by the difference between the pressure within the chamber AS according to point 178¹ and the resulting "negative" pressure from the chambers A and B according to point 176¹. As the pressure on the piston 30, 34 in the servo motor 28 is zero according to point 176², the total axial pressure in the bearing portion has grown to a value according to point 180² so that the bearing play thus continues to be eliminated. With full grinding effect, the curve 180 ends of course also at the point 168. If, to the contrary, the interior axial pressure in the bearing 14 should be constant from idle to full operation, the load on the bearing 14 according to point 168 should become so much higher as corresponds to the axial pressure exerted in the chamber AS according to point 178¹. As a consequence thereof, the grinding disc pressure and therewith the grinding effect ought to be cut down, unless the life of the bearing would be allowed to be reduced very much.

The annular piston 58 may be replaced by a plurality of pot-shaped pistons, which are mounted at spaced places about the circumference of the bearing element 42, 43 which is formed with corresponding axial cylindric bores. These bores form pressure chambers which are connected with the conduit 110 preferably made common to them all.

While one more or less specific embodiment of the invention has been shown and described, it is to be understood that this is for purpose of illustration only, and that the invention is not to be limited thereby, but its scope is to be determined by the appended claims.

I claim:

1. A grinding apparatus for fibrous material comprising:
   a. a pair of grinding discs;
   b. a rotatable shaft carrying at least one of said grinding discs;
   c. a thrust bearing supporting said shaft adapted to absorb axial as well as radial thrust;
   d. a bearing casing for said thrust bearing;
   e. a servo-motor connected to said thrust bearing operative in response to axial displacements of the shaft and the disc carried thereby;
   f. a housing for said servo-motor having a piston adapted to reciprocate longitudinally therein;
   g. a flange on said piston dividing said housing into a first pressure chamber and a second pressure chamber;
   h. said first pressure chamber being operative to produce grinding pressure between the discs;
   i. said second pressure chamber being operative to release grinding pressure in response to variation in grinding pressure;
   j. said thrust bearing comprising:
      i. a pair of inner spaced annular members secured on said shaft;
      ii. a stationary supporting member mounted in said bearing casing between said inner annular members;
      iii. a pair of outer annular members resiliently carried by said supporting member;
      iv. roller bearing members interposed between said inner and outer annular members;
   k. a third pressure chamber between said supporting member and said outer annular member responsive to axial displacement of said thrust bearing;
   l. a pressure fluid connection between said third pressure chamber and said second pressure chamber, and
   m. means for controlling the supply of pressure fluid to said pressure chambers in response to predetermined fluctuation in play of the shaft.

2. A grinding apparatus according to claim 1 in which said third pressure chamber comprises:
   a. a recess in at least one side of said supporting member, and
   b. a piston adapted to reciprocate longitudinally in said recess.

3. A grinding apparatus for fibrous material comprising:
   a. a pair of grinding discs;
   b. a rotatable shaft carrying at least one of said grinding discs;
   c. a thrust bearing supporting said shaft adapted to absorb axial as well as radial thrust;
   d. a bearing casing for said thrust bearing;
   e. rotationally stationary pressure means connected to said thrust bearing operative in response to axial displacements of the shaft and the disc carried thereby to transfer axial pressure through said thrust bearing to produce grinding pressure between the discs;
   f. said thrust bearing comprising:
      i. a pair of inner spaced annular members secured on said shaft;
      ii. a pair of outer annular members carried by said casing;
      iii. roller bearing members interposed with play between each pair of said inner and outer annular members;
   g. a pressure chamber disposed between said outer annular members and being connected to a supply of pressure fluid;
   h. closure means for said chamber being movable axially against one of the outer annular members; and
   i. means for controlling the supply of pressure fluid to said pressure chamber in response to fluctuation in said play so that said supply increases with increase of play and vice versa.

4. A grinding apparatus for fibrous material comprising:
   a. a pair of grinding discs;
   b. a rotatable shaft carrying at least one of said grinding discs;
   c. a thrust bearing supporting said shaft adapted to absorb axial as well as radial thrust;
   d. a bearing casing for said thrust bearing;
   e. a servo-motor connected to said thrust bearing operative in response to axial displacements of the shaft and the disc carried thereby;
   f. a housing for said servo-motor having a piston adapted to reciprocate longitudinally therein;
   g. a flange on said piston dividing said housing into a first pressure chamber and a second pressure chamber;
   h. said first pressure chamber being operative to produce grinding pressure between the discs;
   i. said second pressure chamber being operative to release grinding pressure in response to variation in grinding pressure;
   j. said thrust bearing comprising:
      i. a pair of inner spaced annular members secured on said shaft;
      ii. a stationary supporting member mounted in said bearing casing between said inner annular members;
      iii. a pair of outer annular members engaging said inner annular members;
      iv. a third pressure chamber disposed between said outer annular members and connected to a fluid pressure source for exerting internal axial pressure between said outer annular members and being operative to increase and decrease said internal pressure in response to fluctuation in play of the shaft.

* * * * *